US009348431B2

(12) United States Patent
Hwang

(10) Patent No.: US 9,348,431 B2
(45) Date of Patent: May 24, 2016

(54) DISPLAY DEVICE FOR CONTROLLING AUTO-ROTATION OF CONTENT AND METHOD FOR CONTROLLING AUTO-ROTATION OF CONTENT DISPLAYED ON DISPLAY DEVICE

(71) Applicant: Korea Advanced Institute of Science and Technology, Daejeon (KR)

(72) Inventor: Sungjae Hwang, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 23 days.

(21) Appl. No.: 13/928,864

(22) Filed: Jun. 27, 2013

(65) Prior Publication Data

US 2014/0009387 A1 Jan. 9, 2014

(30) Foreign Application Priority Data

Jul. 4, 2012 (KR) .......................... 10-2012-0072915
Jul. 4, 2012 (KR) .......................... 10-2012-0072927

(51) Int. Cl.
*G09G 5/08* (2006.01)
*G06F 3/03* (2006.01)
*G06F 1/16* (2006.01)

(52) U.S. Cl.
CPC ................ *G06F 3/03* (2013.01); *G06F 1/1694* (2013.01); *G06F 2200/1614* (2013.01); *G06F 2200/1637* (2013.01)

(58) Field of Classification Search
CPC ................ G06F 1/1622; G06F 3/0346; G06F 2200/1614; G09G 2340/0492
USPC .................................................. 345/156, 158
See application file for complete search history.

(56) References Cited

U.S. PATENT DOCUMENTS

| 7,773,073 | B2* | 8/2010 | Nagata et al. ................. 345/169 |
| 2006/0227103 | A1* | 10/2006 | Koo et al. ...................... 345/156 |
| 2011/0164056 | A1* | 7/2011 | Ording .................. G06F 1/1694 345/649 |
| 2013/0002541 | A1* | 1/2013 | Kanehira ....................... 345/156 |
| 2013/0141464 | A1* | 6/2013 | Hunt et al. ..................... 345/659 |

FOREIGN PATENT DOCUMENTS

WO    WO 2011114667 A1 *  9/2011

* cited by examiner

*Primary Examiner* — Stephen Sherman
(74) *Attorney, Agent, or Firm* — Paratus Law Group, PLLC

(57) ABSTRACT

There is provided a display device for controlling rotation of content displayed on a display panel, including: a display panel on which the content is displayed; a sensor configured to measure a pitch θ and a roll Φ of the display device, wherein the pitch θ is a degree to which the display device is tilted with respect to a horizontal plane by an up-down rotation, and the roll Φ is a degree to which the display device is tilted with respect to the horizontal plane by a left-right rotation; and a control processor configured to determine whether or not to rotate the content or to control a rotation speed of the content displayed on the display panel, according to at least one of the pitch θ and the roll Φ.

19 Claims, 13 Drawing Sheets

(a)

(b)

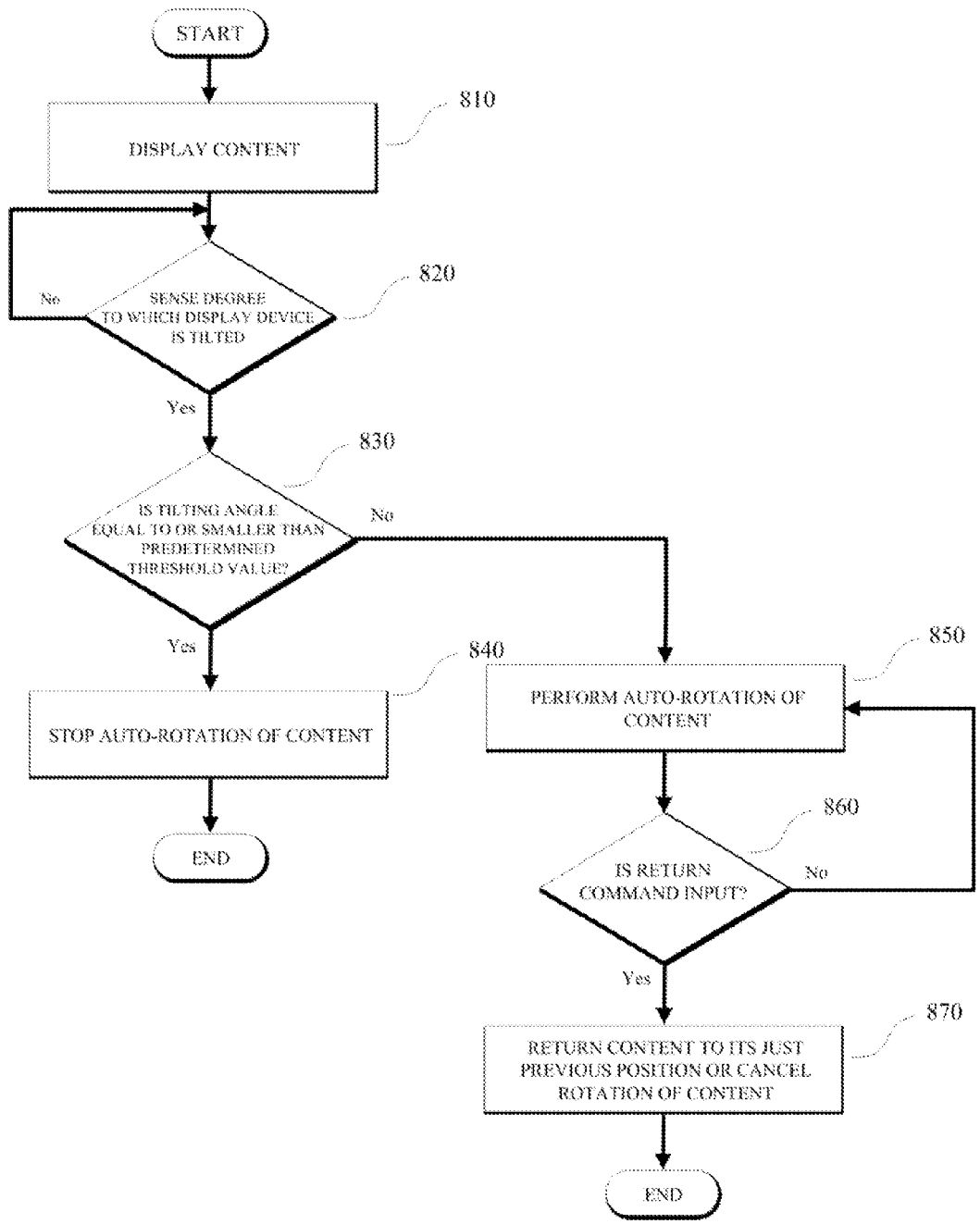

DISPLAY DEVICE FOR CONTROLLING AUTO-ROTATION OF CONTENT AND METHOD FOR CONTROLLING AUTO-ROTATION OF CONTENT DISPLAYED ON DISPLAY DEVICE

CROSS-REFERENCE TO RELATED APPLICATION

This application claims priority to and the benefit under 35 U.S.C. §119(a) of Korean Patent Application No. 2012-0072915, filed on Jul. 4, 2012 and Korean Patent Application No. 2012-0072927, filed on Jul. 4, 2012, in the Korean Intellectual Property Office, the entire disclosure of which is incorporated herein by reference for all purpose.

BACKGROUND

1. Field

The following description relates to a display device for controlling an auto-rotation of displayed content according to the tilting angle of the display device, and a method for controlling an auto-rotation of content in a display device having a content auto-rotation function.

2. Description of Related Art

In general, portable display devices have an aspect ratio of 16:9, 16:10, etc. Accordingly, such a display device generally has a rectangular screen, and content can be displayed in a so-called portrait mode or landscape mode on the screen.

A smart device, such as a smart phone, a tablet PC, etc., can automatically recognize the rotation direction of its display using a sensor. Most of the latest smart devices provide a function of automatically rotating content displayed on a display according to the rotation direction of the display. Such a function is called an auto-rotation.

The auto-rotation is widely used in a smart phone, a tablet PC, etc. Generally, a smart device recognizes the rotation direction of a display using a gravity sensor, an accelerometer, etc. Accordingly, when a smart device stands in the longitudinal direction parallel to the direction of gravity, the auto-rotation will most accurately operate.

SUMMARY

In one general aspect, there is provided a display device for controlling rotation of content to be displayed and rotated on a display panel, including: a display panel configured to display the content; a sensor configured to measure a pitch θ and a roll Φ of the display device, wherein the pitch θ is a degree to which the display device is tilted with respect to a horizontal plane by an up-down rotation, and the roll Φ is a degree to which the display device is tilted with respect to the horizontal plane by a left-right rotation; and a control processor configured to determine whether or not to rotate the content or to control a rotation speed of the content displayed on the display panel, according to at least one of the pitch θ and the roll Φ.

In another aspect, there is provided a method for controlling rotation of content displayed on a display device, including: displaying the content on a display panel of the display device; measuring a pitch θ and a roll Φ of the display device, wherein the pitch θ is a degree to which the display device is tilted with respect to a horizontal plane by an up-down rotation, and the roll Φ is a degree to which the display device is tilted with respect to the horizontal plane by a left-right rotation; and controlling a rotation speed of the content according to at least one of the pitch θ and the roll Φ.

In another general aspect, there is provided a method for controlling rotation of content displayed on a display device, including: displaying the content on a display panel of the display device; rotating, by the display device, the content from a first rotation mode to a second rotation mode; measuring a pitch θ and a roll Φ of the display device, wherein the pitch θ is a degree to which the display device is tilted with respect to a horizontal plane by an up-down rotation, and the roll Φ is a degree to which the display device is tilted with respect to the horizontal plane by a left-right rotation; and controlling the rotation of the content according to the pitch θ and the roll Φ.

BRIEF DESCRIPTION OF THE DRAWINGS

FIG. 13 is a flowchart illustrating an example of a method for controlling rotation and a return mode of content, which is performed by a display device.

Figure 1:
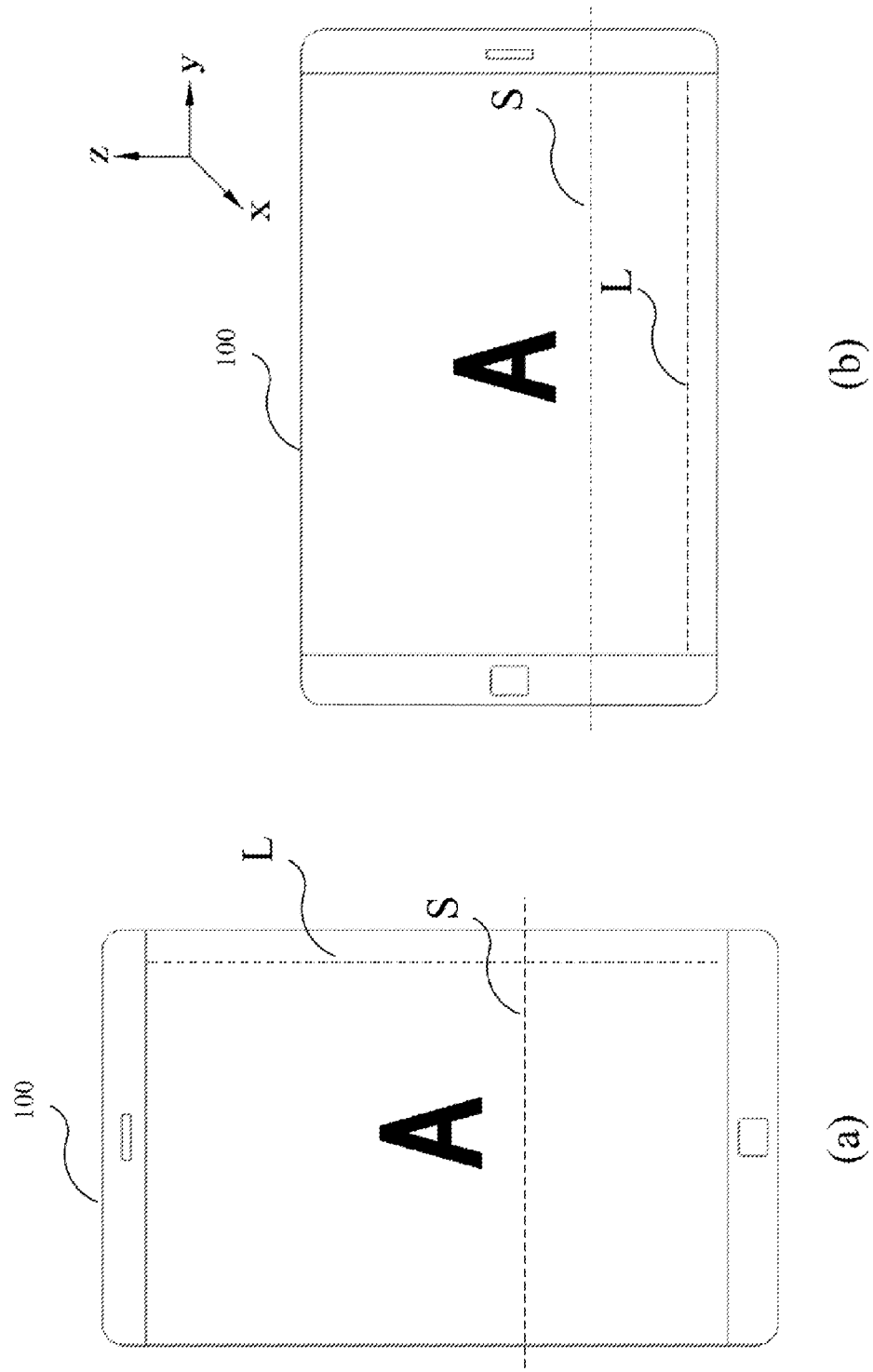
FIG. 1 illustrates an example of a display device in which an auto-rotation function is performed.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The presently described examples will be understood by reference to the drawings, wherein like parts are designated by like numerals throughout. The drawings are not necessarily drawn to scale, and the size and relative sizes of the layers and regions may have been exaggerated for clarity.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Before starting detailed explanations of figures, components that will be described in the specification are discriminated merely according to functions mainly performed by the components or conventionally carried out according to common knowledge of related technical fields. That is, two or more components which will be described later can be integrated into a single component. Furthermore, a single component which will be described later can be separated into two or more components. Moreover, each component which will be described can additionally perform some or all of a function executed by another component in addition to the main function thereof. Some or all of the main function of each component which will be described can be carried out by another component. Accordingly, presence/absence of each component which will be described throughout the specification should be functionally interpreted.

Most of portable smart devices have a built-in display device (for example, a display panel). In other words, a display device is a dependent device that is under the control of a smart device.

However, in the following description, the term "display device" will be used as a more comprehensive concept. A display device which will be described below is a device having a function of controlling content displayed on a display panel, as well as a function of displaying received content. The display device may be a smart phone, a tablet PC, a computer device including a rotating display panel, a display panel having an auto-rotation function, etc.

FIG. 1 illustrates an example of a display device 100 in which an auto-rotation function is performed.

The display device 100 has an auto-rotation function of automatically rotating content displayed on its screen according to the rotation direction of the display device 100. A user may select whether or not to use the auto-rotation function. If a user selects an auto-rotation mode, the display device 100 rotates displayed content according to its rotation direction.

FIG. 1 illustrates a display device 100 and a letter A which is displayed on the screen of the display device 100. The letter A is provided as exemplary content in order to describe a direction of content displayed on the screen of the display device 100. Hereinafter, a direction in which content is displayed is referred to as a screen direction. In the example of FIG. 1, a screen direction is denoted by a dotted line S. For example, letters configuring text are arranged in the S direction.

The display device 100 has three directional lengths: the first one corresponds to a height direction (that is, the longer side of the display device 100); the second one corresponds to a width direction (that is, the shorter side of the display device 100); and the third one corresponds to a thickness direction (that is, the thickness of the display device 100). Among the three directions, the height direction is defined as a length direction. In FIG. 1, the length direction of the display device 100 is denoted by a dotted line L.

The 3-dimensional coordinate directions shown in the upper-right part of FIG. 1 mean a general 3-dimensional coordinate system, wherein Z-axis is the direction of gravity, a plane defined by X-axis and Y-axis is an imaginary horizontal plane of the coordinate system, and a plane defined by X-axis and Z-axis or by Z-axis and Y-axis is one of imaginary vertical planes of the coordinate system.

For convenience of description, it is assumed that the display device 100 illustrated in FIG. 1 rotates when it is positioned on an imaginary vertical plane of the coordinate system. In other words, it is assumed that a plane extending from the display panel of the display device 100 is perpendicular to the imaginary horizontal plane of the coordinate system.

FIG. 1(a) shows a screen direction that is defined as a portrait mode. If the length direction L of the display device 100 is parallel to Z-axis or nearly parallel to Z-axis, the screen of the display device 100 is in the portrait mode. FIG. 1(b) shows a screen direction that is defined as a landscape mode. If the length direction L of the display device 100 is parallel (or nearly parallel) to the imaginary horizontal plane of the coordinate system when a plane extending from the display panel is perpendicular to the imaginary horizontal plane, the screen of the display device 100 is in the landscape mode.

Figure 2:
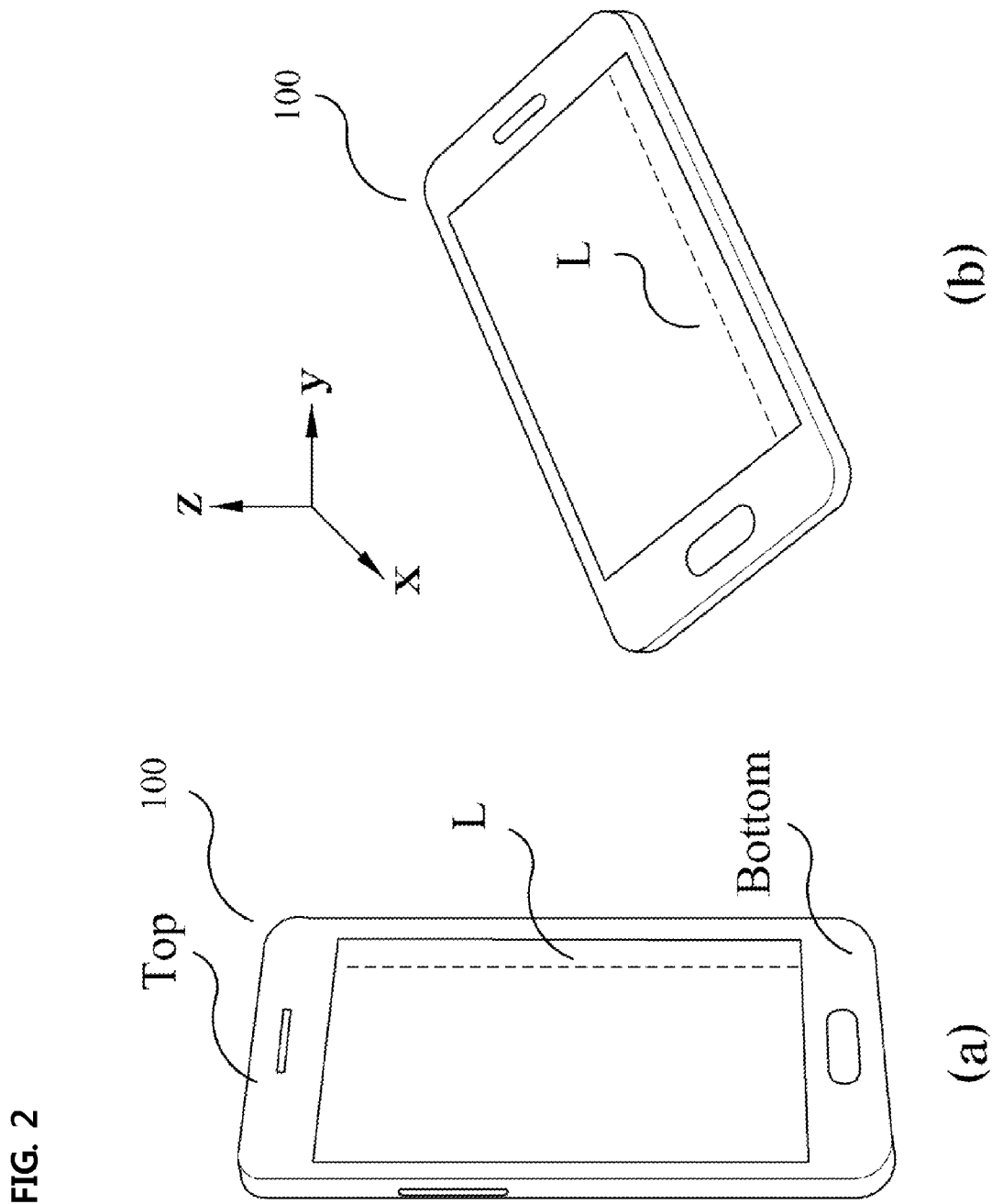
FIG. 2 illustrates an example of a display device in which an auto-rotation function is performed when the display device is positioned in a 3-dimensional coordinate system.

FIG. 2 illustrates an example of the display device 100 in which an auto-rotation function is performed when the display device 100 is positioned in a 3-dimensional coordinate system. As illustrated in FIG. 2(a), when the length direction L of the display device 100 is parallel to Z-axis, the display device 100 can accurately perform the auto-rotation function. However, as illustrated in FIG. 2(b), if a plane extending from the display panel of the display device 100 is parallel (or nearly parallel) to the imaginary horizontal plane of the coordinate system, the auto-rotation function may wrongly operate. In other words, when the display device 100 is positioned on a horizontal (or nearly horizontal) plane, the auto-rotation function may wrongly operate.

The display device 100 determines its direction using at least one sensor 110 (see FIG. 7) installed therein, and perform an auto-rotation based on the determined direction.

The sensor 110 may be an accelerometer or a gravity sensor. The accelerometer or the gravity sensor measures values changing according to gravity applied to the display device 100. If the display device 100 is positioned horizontally on the horizontal plane, a change in acceleration or location of the display device 100 with respect to gravity cannot be measured so that the auto-rotation cannot properly operate. Furthermore, even when the display device 100 makes a small angle with respect to the horizontal plane, the rotation state of the display device 100 cannot be accurately measured so that the auto-rotation cannot properly operate.

The auto-rotation depends on whether the top of the display device 100 as shown in FIG. 2(a) is positioned in the up-down direction or in the left-right direction with respect to the direction of gravity. However, this is only exemplary, and the auto-rotation may depend on the position of the bottom or side of the display device 100 with respect to the direction of gravity. That is, the auto-rotation depends on the position of the display device 100 with respect to gravity. Since the auto-rotation has been well-known to one of ordinary skill in the art, a detailed description thereof will be omitted.

In this disclosure, it is important to determine whether the display device 100 is positioned parallel (or nearly parallel) to the imaginary horizontal plane of the coordinate system. First, terms for defining the direction or angle in which the display device 100 is positioned in the 3-dimensional coordinate system will be described below.

Figure 3:
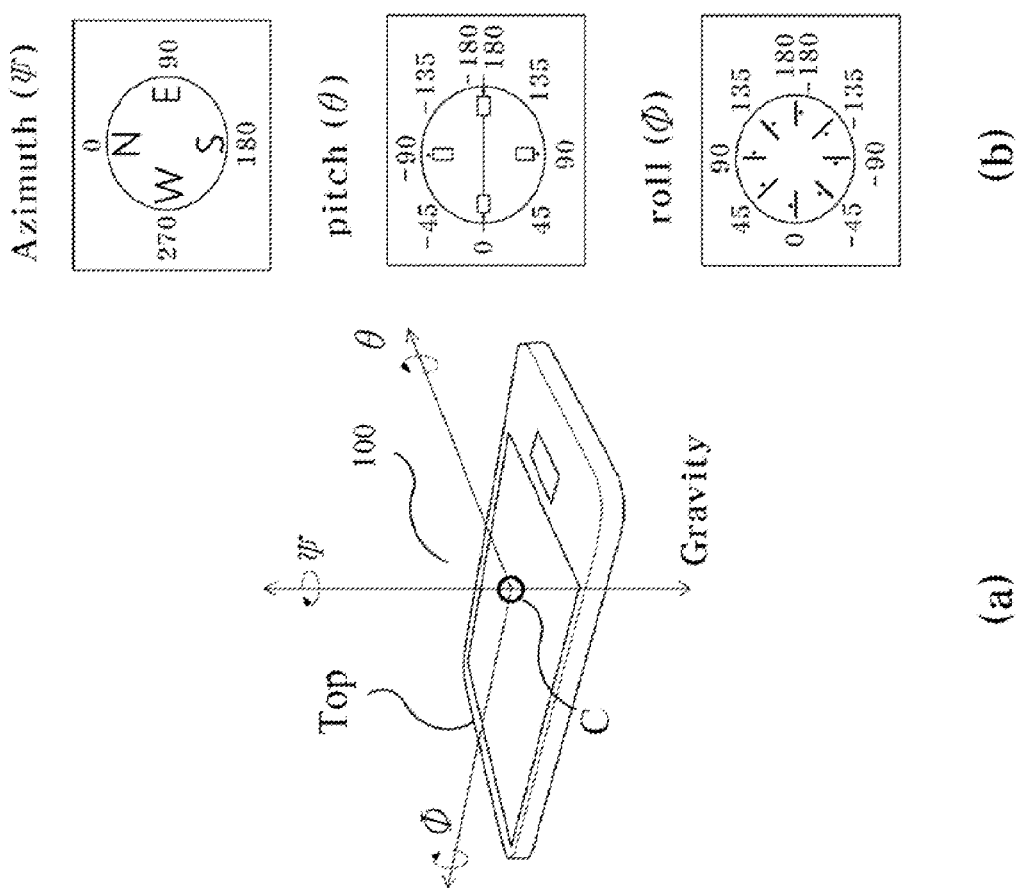
FIG. 3 illustrates an example of a direction in which a display device is positioned in a 3-dimensional coordinate system.

FIG. 3 illustrates an example of a direction in which the display device 100 is positioned in the 3-dimensional coordinate system. FIG. 3(a) shows three axes on which the display device 100 can rotate. In FIG. 3(a), a point (the center of a circle denoted by C) at which the three axes meet is the center of gravity of the display device 100. FIG. 3(b) shows values measured when the display device 100 rotates on the respective axes.

The azimuth $\Psi$ represents a direction pointed by the top of the display device 100 when the display device 100 is positioned horizontally on the horizontal plane of the coordinate system. As illustrated in the upper part of FIG. 3(b), the azimuth $\Psi$ has a value of 0 when the top of the display device 100 points north. The value of the azimuth $\Psi$ increases gradually in the clock-wise direction from north, and reaches 180 when the top of the display device 100 points south.

The pitch $\theta$ represents a degree to which the top of the display device 100 is tilted with respect to the horizontal plane. As illustrated in the middle part of FIG. 3(b), the pitch $\theta$ has a value of 0 when the display panel of the display device 100 is positioned horizontally in a direction against the gravity direction. The value of the pitch $\theta$ decreases as the top of the display device 100 rises higher, and reaches −180 when the display panel faces the direction of gravity with respect to the horizontal plane. On the contrary, the value of the pitch $\theta$ increases gradually as the top of the display device 100 is lowered from when the pitch $\theta$ is 0. In the middle part of FIG. 3(b) showing the pitch $\theta$, rectangles represent the display device 100, and points represent the top of the display device 100.

The roll $\Phi$ represents a degree to which the sides of the display device 100 are tilted with respect to the horizontal plane of the coordinate system. In other words, the roll $\Phi$ represents a degree to which the display device 100 rotates on the length direction axis illustrated in FIG. 3(a). As illustrated in the lower part of FIG. 3(b), the roll $\Phi$ has a value of 0 when the display device 100 is positioned such that the display panel is wholly shown from the top. The value of the roll $\Phi$ increases gradually as the left side of the display device 100 rises higher, and decreases gradually as the right side of the display device 100 rises higher. The roll $\Phi$ has a value of 180 or −180 when the display device 100 is positioned such that the back of the display panel is wholly shown from the top. In the lower part of FIG. 3(b) showing the roll $\Phi$, straight lines represent the length-directional section of the display device 100, and points represent the front side of the display device 100 on which the display panel is disposed.

Figure 4:
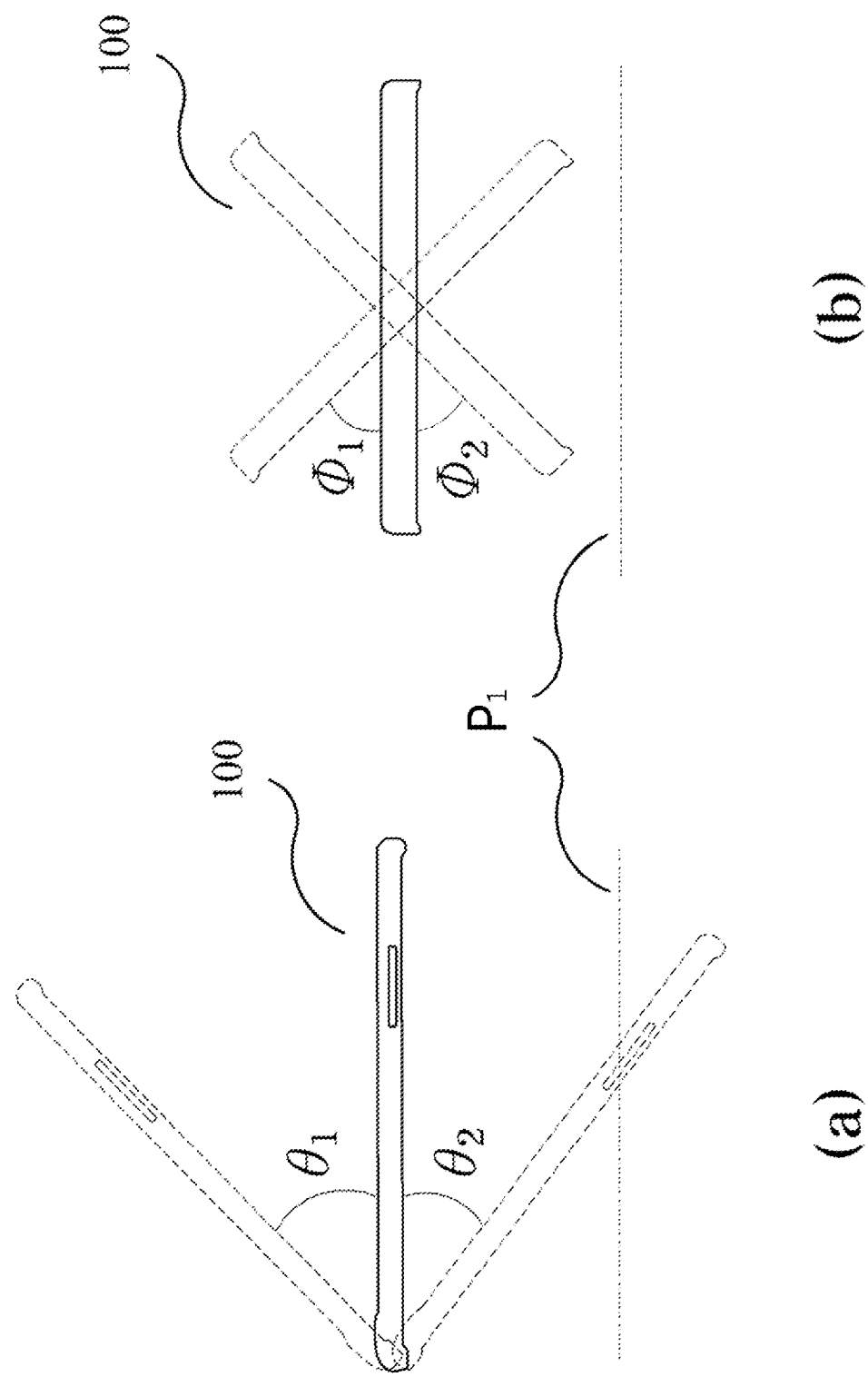
FIG. 4 illustrates an example of a case in which an auto-rotation needs to be controlled according to the tilting direction of a display device having an auto-rotation function.

FIG. 4 illustrates an example of a case in which an auto-rotation needs to be controlled according to the tilting direction of the display device 100 having the auto-rotation function. In FIG. 4, $P_1$ represents the imaginary horizontal plane of the coordinate system, and the display device 100 denoted by dotted lines represents the position of the display device 100 when it is tilted.

FIG. 4(a) is a longitudinal side view of the display device 100, and shows cases in which the display device 100 is positioned with predetermined pitches $\theta_1$ and $\theta_2$. In FIG. 4(a), the display device 100 represented by solid lines corresponds to when the display device 100 is positioned parallel to the imaginary horizontal plane $P_1$. When the display device 100 is positioned parallel to the imaginary horizontal plane $P_1$, the auto-rotation will not properly operate. Even when the display device 100 is positioned nearly parallel to the imaginary horizontal plane $P_1$, the auto-rotation may not properly operate. That is, when the display device 100 is positioned within a predetermined angle range with respect to the imaginary horizontal plane $P_1$, the auto-rotation may not properly operate. For example, as illustrated in FIG. 4(a), when the display device 100 is positioned with an angle between $\theta_1$ and $\theta_2$ with the imaginary horizontal plane $P_1$, the auto-rotation may not properly operate.

FIG. 4(b) is a longitudinal cross-sectional view of the display device 100, and shows cases in which the display device 100 is positioned with predetermined rolls $\Phi_1$ and $\Phi_2$. In FIG. 4(b), the display device 100 represented by solid lines is positioned parallel to the imaginary horizontal plane $P_1$. For example, as illustrated in FIG. 4(b), when the display device 100 is positioned with a roll between $\Phi_1$ and $\Phi_2$ with respect to the imaginary horizontal plane $P_1$, the auto-rotation may not properly operate.

In the cases illustrated in FIGS. 4(a) and 4(b), it is assumed that the front display panel of the display device 100 faces down. However, although the display panel faces up, the auto-rotation may not properly operate if the display device 100 is positioned to be within the predetermined angle ranges as described above.

A range in which the display device 100 is tilted with respect to a horizontal plane so that the auto-rotation does not properly operate (or may not properly operate) will be referred to as a wrong operation range.

The wrong operation range may be defined by various criteria. In the example with reference to FIG. 4, the angle range between $\theta_1$ and $\theta_2$ or between $\Phi_1$ and $\Phi_2$ can be defined as a wrong operation range. In this case, $\theta_1$, $\theta_2$, $\Phi_1$, and $\Phi_2$ correspond to threshold values, respectively.

However, threshold values may be set to different values according to the function of the sensor 110 (see FIG. 7) installed in the display device 100 or according to the kind of the sensor 110 used for auto-rotation.

Figure 5:
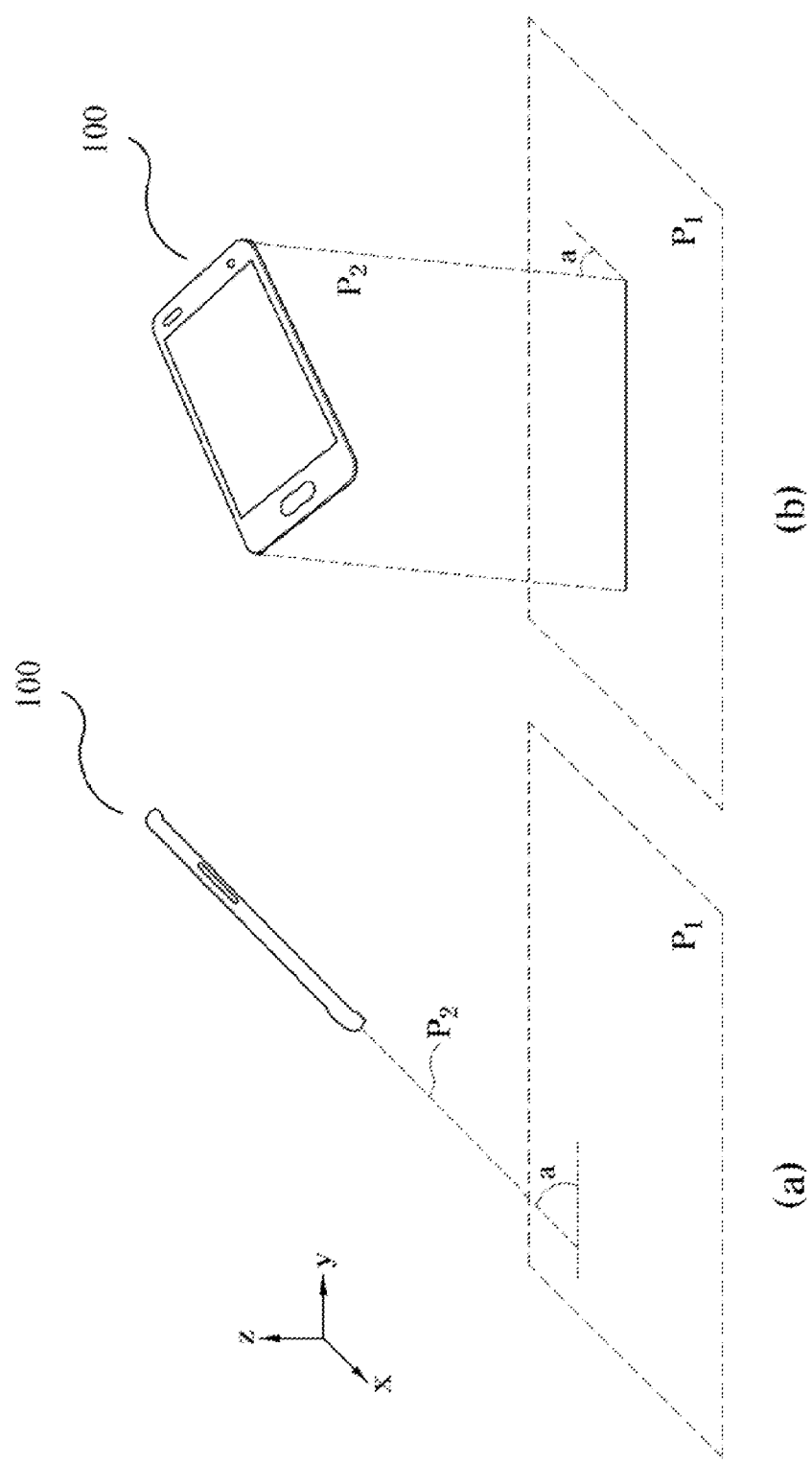
FIG. 5 illustrates examples in which an imaginary plane extending from the display panel of a display device makes a predetermined angle with the imaginary horizontal plane of a coordinate system.

FIG. 5 illustrates an example in which an imaginary plane extending from the display panel of the display device 100 makes a predetermined angle with the imaginary horizontal plane $P_1$ of the coordinate system. FIG. 5(a) corresponds to a case in which the display device 100 has a predetermined pitch with the imaginary horizontal plane without having any left or right roll. In FIG. 5(a), a horizontal plane $P_2$ extending from the display panel makes a predetermined angle "a" with the imaginary horizontal plane $P_1$. FIG. 5(b) corresponds to a case in which the display device 100 has both a predetermined pitch and a left-right roll. In the example of FIG. 5(b), likewise, an imaginary plane $P_2$ extending from the display panel makes a predetermined angle "a" with the imaginary horizontal plane $P_1$. The imaginary plane $P_2$ makes two angles of "a" and "180°−a" with the imaginary horizontal plane $P_1$, and the angle between $P_1$ and $P_2$ can be decided as one of the two angles.

FIG. 5 is a view for describing a criterion for defining a wrong operation range. As described above, a wrong operation range may be defined based on an angle which an imaginary plane extending from a display panel makes with an imaginary horizontal plane.

Figure 6:
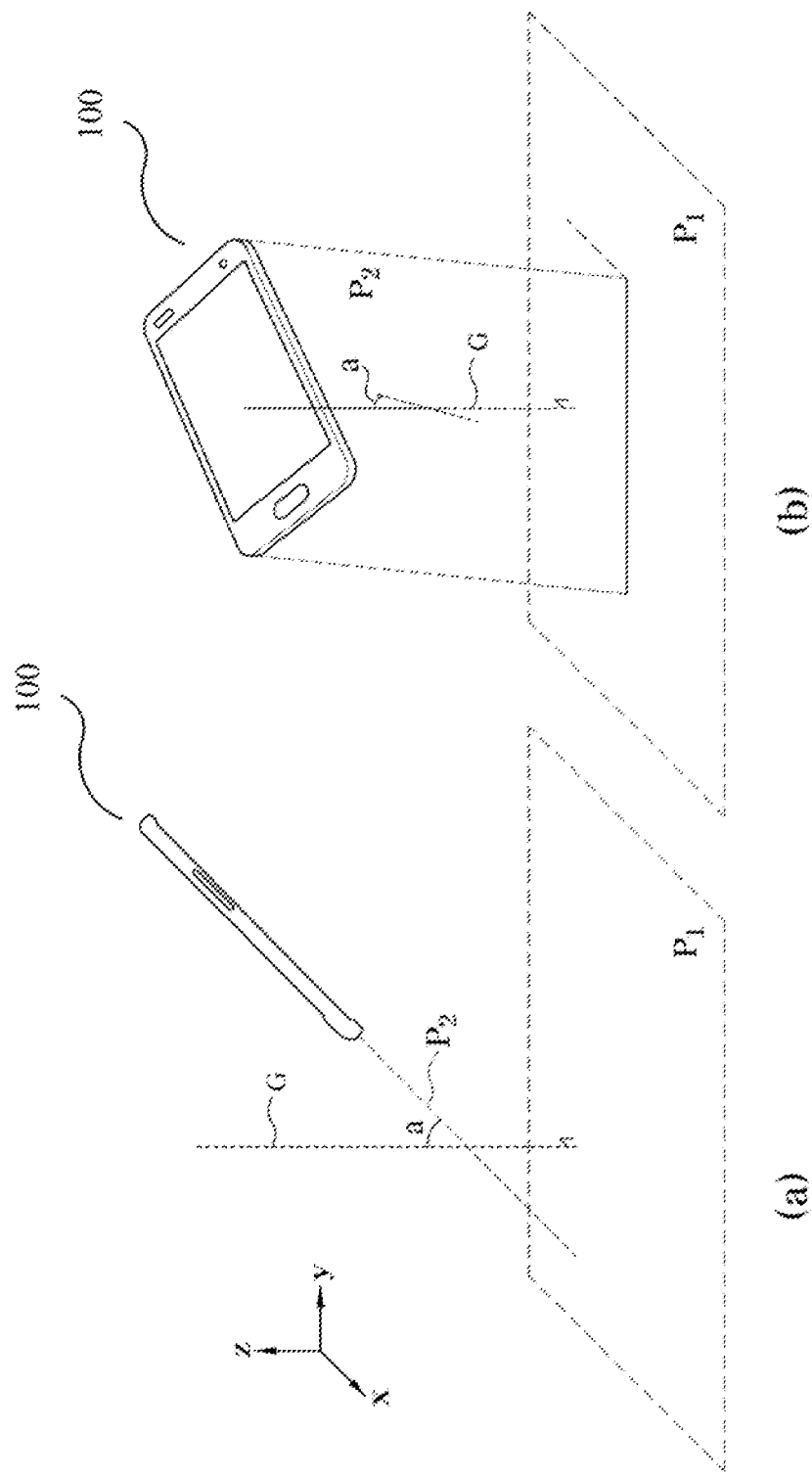
FIG. 6 illustrates examples in which an imaginary plane extending from the display panel of a display device makes a predetermined angle with respect to an imaginary straight line extending in the direction of gravity.

FIG. 6 illustrates examples in which an imaginary plane extending from the display panel of the display device 100 makes a predetermined angle "a" with an imaginary straight line extending in the direction of gravity.

In FIG. 6, $P_2$ represents the imaginary plane extending from the display panel, $P_1$ represents the imaginary horizontal plane of the coordinate system, and G represents the imaginary straight line extending in the direction of gravity, wherein G is perpendicular to $P_1$. FIG. 6(a) and FIG. 6(b) illustrate examples in which $P_2$ makes the predetermined angle a with G. In FIG. 6(b), the dotted line of G is a part of G located behind $P_2$, and the solid line of G is a part of G located in front of $P_2$. FIG. 6 is a view for describing another criterion for defining a wrong operation range. That is, the wrong operation range may be defined based on an angle which an imaginary plane extending from a display panel makes with an imaginary straight line extending in the direction of gravity. $P_2$ makes two angles of "a" and "180°–a" with G, and the angle between $P_2$ and G can be decided as one of the two angles.

The wrong operation range may be defined based on another criterion than the criteria described above with reference to FIGS. 5 and 6. For example, a wrong operation range may be defined based on an angle at which an imaginary straight line perpendicular to the display panel of the display device 100 makes with an imaginary horizontal plane of the coordinate system. As another example, a wrong operation range may be defined based on an angle at which an imaginary straight line perpendicular to the display panel of the display device 100 makes with an imaginary straight line extending in the direction of gravity.

The display device 100 determines whether it is positioned within the wrong operation range using at least one sensor 110 included in the display device 100. The display device 100 may determine whether it is located within the wrong operation range based on various criteria as described above. Accordingly, a criterion used by the display device 100 in order to determine the location of the display device 100 does not influence the scope of the present invention.

Generally, whether or not the display device 10 is positioned within the wrong operation range depends on the tilting direction of the display device 100. The tilting direction of the display device 100 may be determined with respect to a comparison target such as a vertical plane, however, for consistency of description, the tilting direction of the display device 100 is determined with respect to an imaginary horizontal plane as illustrated in FIGS. 5 and 6. The tilting angle of the display device 100 is defined as a degree to which the display device 100 is tilted with respect to the imaginary horizontal plane of the coordinate system regardless of values about the azimuth of the display device 100.

The tilting direction of the display device 100 may be described based on the azimuth $\Psi$, pitch $\theta$, and roll $\Phi$ as described above. However, the auto-rotation is not influenced by directions, such as north, south, east, and west. Hereinafter, an example in which whether or not the display device 100 is positioned within a wrong operation range is determined based on values about pitch $\theta$ and roll $\Phi$ will be described.

As described above, the pitch $\theta$ is a degree to which the display device 100 is tilted with respect to an imaginary horizontal plane by its up-down rotation, and the roll $\Phi$ is a degree to which the display device 100 is tilted with respect to the imaginary horizontal plane by its right-left rotation. In detail, the pitch $\theta$ is a degree to which the display device 100 is tilted with respect to the imaginary horizontal plane when it rotates against an imaginary axis perpendicular to the longitudinal direction of the display device 100, and the roll $\Phi$ is a degree to which the display device 100 is tilted with respect to the imaginary horizontal plane when it rotates against the longitudinal axis of the display device 100.

Figure 7:
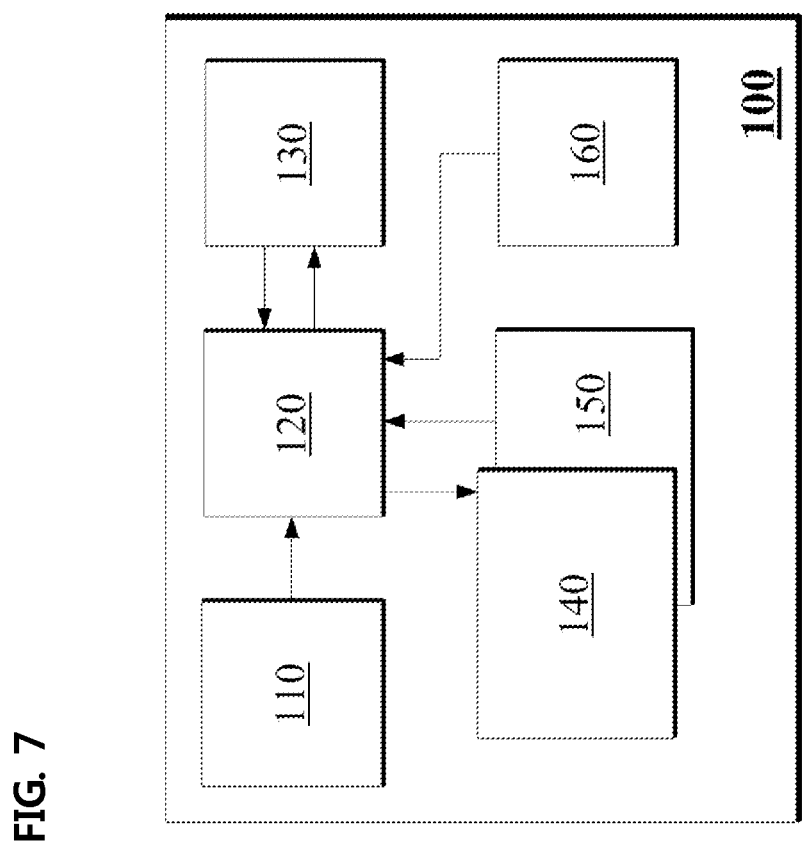
FIG. 7 is a block diagram illustrating an example of a display device.

FIG. 7 is a block diagram illustrating an example of the display device 100. The display device 100 includes a display panel 140, at least one sensor 110, and a control processor 120. The display panel 140 displays content thereon. The sensor 110 measures a pitch which is a degree to which the display device 100 is tilted with respect to a horizontal plane by its up-down rotation, and a roll which is a degree to which the display device 100 is tilted with respect to the horizontal plane by its left-right rotation. The control processor 120 determines whether to rotate content displayed on the display panel 140 or controls the rotation speed of the content according to at least one of the pitch and the roll.

The sensor 110 may include at least one of a gravity sensor, a geomagnetic sensor, an accelerometer, and a gyroscope. In FIG. 7, the sensor 110 is shown as a single block, however, generally, the display device 100 includes a plurality of sensors. The individual sensors may be disposed at different locations in the display device 100.

A sensor manufactured based on Micro Electronic Mechanical System (MEMS) technology can be used even in a small-size display device (100).

The gravity sensor measures a location in which the display device 100 is positioned with respect to the direction of gravity. The display device 100 can recognize the direction and intensity of gravity applied thereto based on 3-dimensional vectors calculated by the gravity sensor. Also, the display device 100 can determine its tilting direction using the gravity sensor.

The accelerometer is a device for detecting a change in velocity in units of a predetermined time period, and senses a dynamic force, such as acceleration, vibration, impact, etc. A 3-axis accelerometer includes a plurality of sensors respectively positioned in the x-, y-, and z-axis directions in the display device 100. The display device 100 may obtain values measured in the respective axis directions as vector values. The display device 100 may determine a direction in which the display device 100 is tilted based on values acquired with respect to the three axes.

The geomagnetic sensor is used to measure the intensity of a magnetic field. Generally, three geomagnetic sensors corresponding to x-, y-, and z-axis directions are used. The display device 100 measures the direction of a magnetic field applied to the three sensors based on a sum of vectors output from the sensors. The display device 100 determines a direction in which the display device 100 is positioned with respect to the earth's magnetic field using the geomagnetic sensor.

The gyroscope is a sensor for calculating an angle to which the display device 100 rotates with respect to an axis, as a numerical value. A 3-axis gyroscope calculates the degree to which the display device 100 rotates with respect to three axes. Since the above-mentioned sensors have been well-known in the art, detailed descriptions thereof will be omitted.

The control processor 120 is in charge of the control of the display device 100. If the display device 100 is a smart phone or the like, an operating unit such as CPU corresponds to the control processor 120. Alternatively, the control processor 120 may be a dedicated chip-set for controlling the auto-rotation of the display device 100.

The control processor 120 does not rotate content displayed on the display panel 140 (see FIG. 7) of the display device 100 or lowers the rotation speed of the content, if the pitch $\theta$ of the display device 100 is within a first threshold range and the roll $\Phi$ of the display device 100 is within a second threshold range.

On the contrary, if the pitch θ of the display device 100 deviates out of the first threshold range and the roll Φ of the display device 100 deviates out of the second threshold range, the control processor 120 rotates the content at maximum speed or increases the rotation speed of the content.

The first threshold range for the pitch θ may be −45≤θ≤45, −135≤θ≤−180, or 135≤θ≤180, and the second threshold range for the roll Φ may be −45≤Φ≤45, −135≤Φ≤−180, or 135≤Φ≤180. If the display device 100 is positioned parallel to a horizontal plane, the pitch θ is 0, −180, or +180, while the roll Φ is 0, −180, or +180. That is, when the pitch θ of the display device 100 is within the first threshold range and the roll Φ of the display device 100 is within the second threshold range, the display device 100 can be determined to be within a wrong operation range. Here, the first and second threshold ranges may vary depending on the performances, etc. of sensors used in the display device 100.

The control processor 120 may control the rotation speed of content displayed on the display device 100 according to at least one of the pitch θ and the roll Φ. The control processor 120 may use the pitch θ or the roll Φ as a criterion for controlling the rotation speed of content, or both the pitch θ and the roll Φ as a criterion for controlling the rotation speed of the content.

For example, the control processor 120 may directly calculate a rotation speed of content corresponding to at least one of a pitch θ and a roll Φ. Alternatively, the display device 100 may use a memory 130 in which a rotation speed of content corresponding to at least one of a pitch θ and a roll Φ of the display device 100 is stored. In the latter case, the control processor 120 may determine whether at least one of a pitch θ and a roll Φ, measured by the sensor 110, matches corresponding data stored in the memory 130, thereby determining a rotation speed of content.

The control processor 120 may analyze the pitch θ and the roll Φ, and if a degree to which the display device 100 is tilted with respect to a horizontal plane exceeds a predetermined threshold value, the control processor 120 may increase a rotation speed of content according to a degree by which the tilting degree of the display device 100 exceeds the predetermined threshold value. The tilting degree of the display device 100 means, as illustrated in FIG. 5, an angle a which a plane extending from the display panel 140 of the display device 100 makes with the horizontal plane of the coordinate system. For example, the predetermined threshold value may be 45°. However, the predetermined threshold value can be set to an optimal value according to the performance of the display device 100, the performance and kind of the sensor 110, etc.

Figure 8:
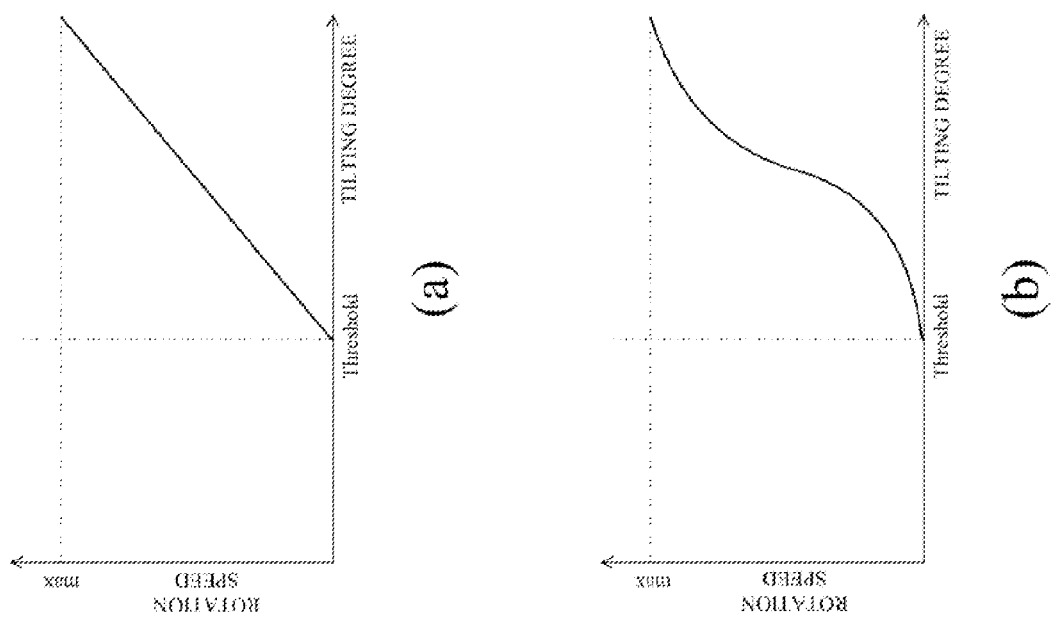
FIG. 8 is graphs illustrating an example of the rotation speed of content with respect to the degree to which a display device is tilted.

FIG. 8 illustrates an example of graphs for the rotation speed of content with respect to the degree to which the display device 100 is tilted. If the tilting degree of the display device 100 exceeds a predetermined threshold value, the control processor 120 (see FIG. 7) rotates content at maximum speed. Alternatively, if the tilting degree of the display device 100 exceeds a predetermined threshold value, the control processor 120 may increase the rotation speed of content gradually according to a degree by which the tilting degree of the display device 100 exceeds the predetermined threshold value. For example, as illustrated in FIG. 8(a), the control processor 120 may increase the rotation speed of content linearly in correspondence to a degree by which the tilting degree of the display device 100 exceeds the predetermined threshold value. Also, as illustrated in FIG. 8(b), the control processor 120 may increase the rotation speed of content nonlinearly according to a degree by which the tilting degree of the display device 100 exceeds the predetermined threshold value. If the rotation speed of content increases as illustrated in FIG. 8(b), a user can easily recognize a change in rotation speed of content.

If the display device 100 positioned within a range in which the auto-rotation normally operates moves to within a range in which the auto-rotation may wrongly operate, a wrong rotation of content may occur regardless of the user's intention.

In this case, the user may want to return the content to its just previous position while such a wrong rotation occurs or after the wrong rotation has occurred in the display device 100. For example, if the display device 100 is tilted to enter a wrong operation range when it is in a first rotation mode, the corresponding content may rotate to a second rotation mode. The second rotation mode is a screen position caused by a wrong rotation regardless of the user's intention. If the first rotation mode is a landscape mode, the second rotation mode is a portrait mode, and if the first rotation mode is a portrait mode, the second rotation mode is a landscape mode. For convenience of description, hereinafter, an event for returning a wrong rotation of content to its just previous position is referred to as a return mode. The return mode may be executed by various methods.

First, if while a wrong rotation occurs, another wrong rotation occurs, a user may touch the touch panel 150 of the display device 100. In this case, the control processor 120 may determine that a touch input occurs when the display device 100 is positioned within a wrong operation range, and enter the return mode. In the return mode, the control processor 120 may return the current position of content to its just previous position before it has rotated, or may cancel the content's rotation if a touch input occurs while the content is rotating. Since the display device 100 such as a smart phone generally uses a touch panel 150, the above description has been given in regard of a touch panel 150, however, a device such as a keypad other than a touch panel 150 may also be used as a device for receiving a return command from a user.

A user may enjoy content after putting the display device 100 on a horizontal plane or after lying down holding the display device 100 with his/her hand. That is, a touch input may occur when the display device 100 is positioned on the horizontal plane. However, interpreting this case as a return command may cause a problem. In order to prevent occurrence of a wrong return command, the user may set use of the return mode in advance. Alternatively, the control processor 120 may interpret only a touch input occurred in a predetermined time period after rotation of content has occurred, as a return command. For example, the control processor 120 may enter the return mode only when a touch input occurs in 1 to 2 seconds after a wrong rotation has occurred.

Second, if while a wrong rotation occurs, another wrong rotation occurs, a user may tilt the display device 100 such that the display device 100 deviates out of the wrong operation range. For example, it is determined whether a wrong operation occurs based on an angle which the display device 100 makes with respect to a horizontal plane, and a threshold value for determining whether the display device 100 is within the wrong operation range is assumed to be 45°. In this case, if a wrong rotation occurs when the user tilts the display device 100 such that an angle which the display device 100 makes with respect to the horizontal plane is 40°, the user may tilt the display device 100 while the wrong rotation occurs or after the wrong rotation has occurred, to adjust an angle between the display device 100 and the horizontal plane to, for example, 60°. That is, if the display device 100 moves to within the wrong operation range and then deviates out of the wrong operation range, the display device 100 enters the return mode.

Third, the return mode may be performed by a camera 160 (see FIG. 7) disposed in the same side as the display panel of the display device 100. The camera 160 photographs the user's face, and the control processor 120 analyzes the user's face image acquired by the camera 160 while a wrong rotation occurs or after the wrong rotation has occurred to thus determine whether a wrong rotation has occurred.

Figure 9:
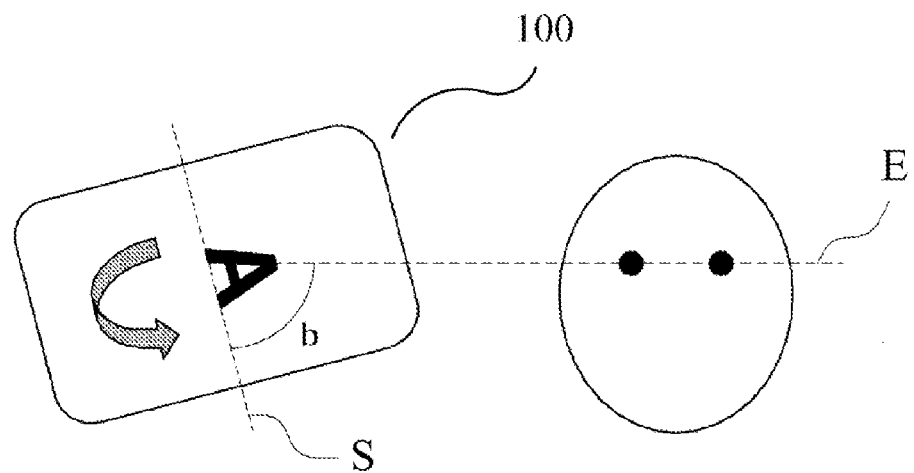
FIG. 9 illustrates an example of a return mode in which rotated content returns to its just previous position using a camera.
Figure 9:
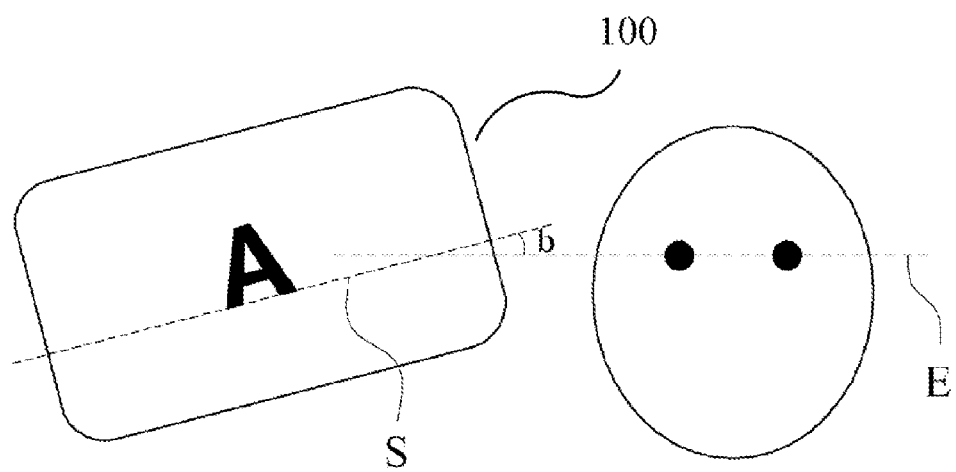

FIG. 9 illustrates an example of a return mode in which rotated content returns to its just previous position using the camera 160. In FIG. 9, S is an imaginary straight line representing the screen direction of the display device 100, and E is an imaginary straight line connecting the centers of both eyes in a user's face photographed by the camera 160. Generally, the imaginary straight line E connecting the centers of the user's both eyes and the imaginary straight line S representing the screen direction of the display device 100 should be nearly parallel to each other. If an angle which the imaginary straight line E makes with respect to the imaginary straight line S exceeds a predetermined threshold value, there is high probability that content currently displayed on the display device 100 has wrongly rotated. Hereinafter, the predetermined threshold value for determining a wrong rotation of content is referred to as a straight line threshold value. The straight line threshold value may be set to about 30°. However, the straight line threshold value may be set to an appropriate value according to the user's intention using the display device 100, the kind of content displayed on the display device 100, etc.

FIG. 9(a) illustrates a case in which a wrong rotation has occurred in the display device 100 positioned within a wrong operation range. In this case, the control processor 120 (see FIG. 7) analyzes a user's face image acquired by the camera 160 (see FIG. 7), detects a straight line connecting the centers of the user's both eyes, and determines an angle b which the straight line makes with respect to the current screen direction of the display device 100. If the control processor 120 determines that the angle b exceeds a predetermined threshold value, the control processor 120 returns content to its just previous position before the content has rotated, which is illustrated in FIG. 9(b).

Figure 10:
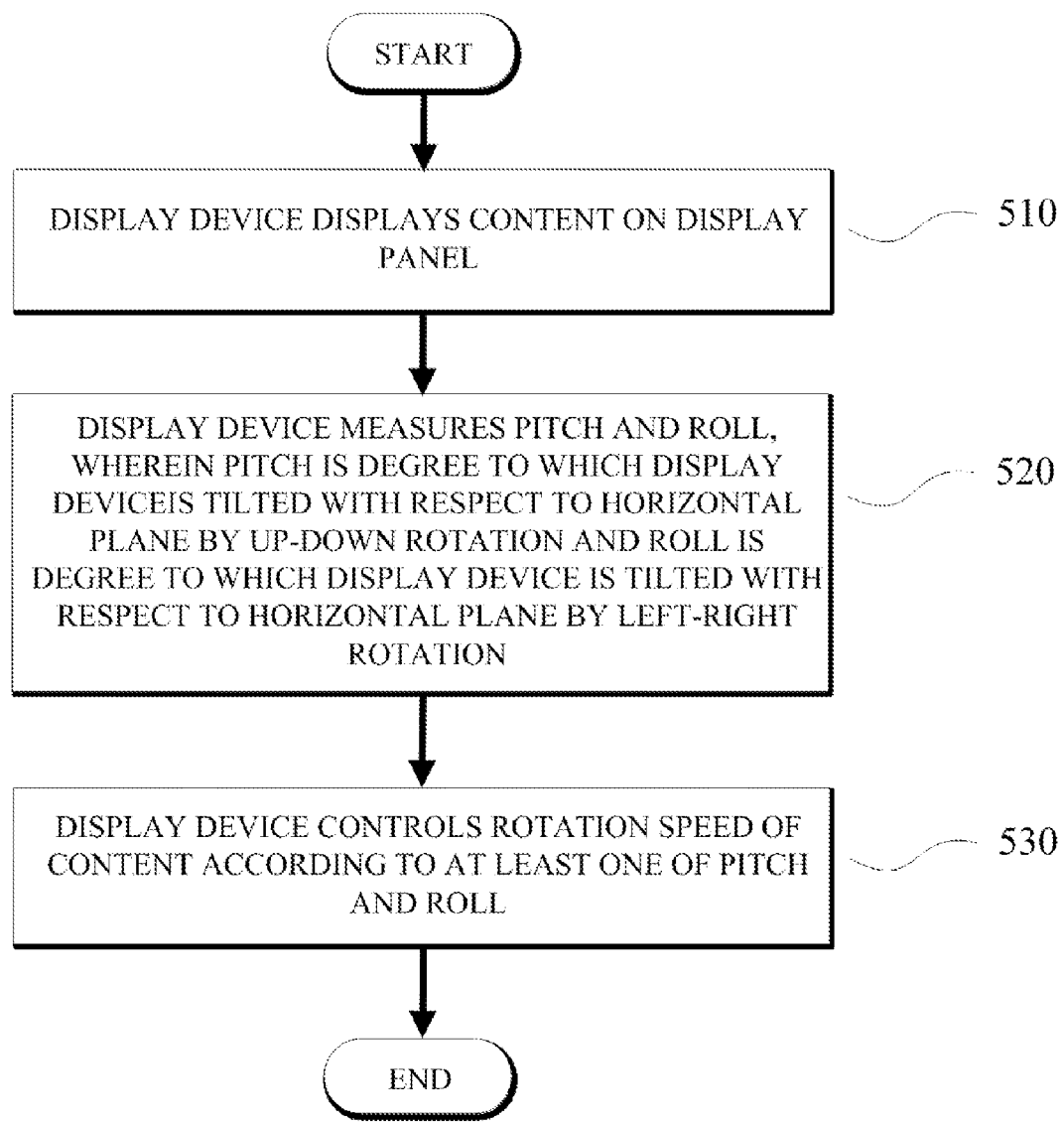
FIG. 10 is a flowchart illustrating an example of a method for controlling a rotation speed of content displayed on a display device.

FIG. 10 is a flowchart illustrating an example of a method 500 for controlling a rotation speed of content displayed on the display device 100, according to an embodiment of the present invention.

The method for controlling the rotation speed of content displayed on the display device 100 includes: operation 510 in which the display device 100 displays content on the display panel 140 (see FIG. 7); operation 520 in which the display device 100 measures a pitch and a roll, wherein the pitch is a degree to which the display device 100 is tilted with respect to a horizontal plane by its up-down rotation, and the roll is a degree to which the display device 100 is tilted with respect to the horizontal plane by its left-right rotation; and operation 530 in which the display device 100 controls a rotation speed of the content according to at least one of the pitch and the roll.

In operation 530, the display device 100 may analyze the pitch and the roll, and if a degree to which the display device 100 is tilted with respect to the horizontal plane does not exceed a predetermined threshold value, the display device 100 may not rotate the content or may lower the rotation speed of the content.

Also, in operation 530, if the degree to which the display device 100 is tilted with respect to the horizontal plane exceeds the predetermined threshold value, the display device 100 may rotate the content at maximum speed or increase the rotation speed of the content.

Also, in operation 530, the display device 100 analyzes the pitch and the roll, and may control the rotation speed of the content according to the magnitude of a degree to which the display device 100 is tilted with respect to the horizontal plane. As illustrated in FIG. 8, if a degree to which the display device 100 is tilted with respect to the horizontal plane exceeds a predetermined threshold value, the display device 100 may control the rotation speed of content according to the tilting degree of the display device 100 by various methods.

Figure 11:
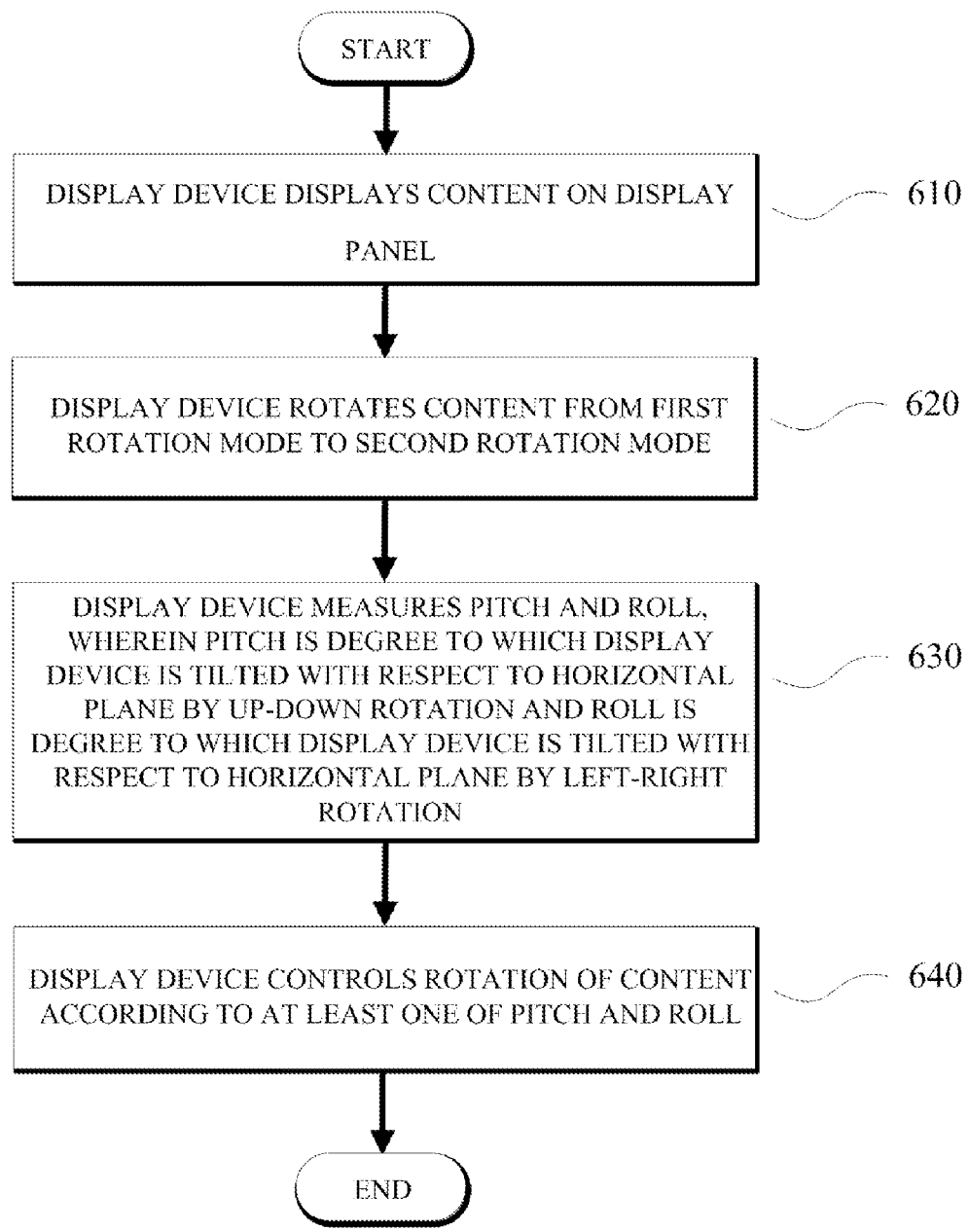
FIG. 11 is a flowchart illustrating an example of a method for controlling a return mode of content displayed on a display device.

FIG. 11 is a flowchart illustrating an example of a method 600 for controlling a return mode of content displayed on the display device 100, according to an embodiment of the present invention.

The method for controlling the return mode of content displayed on the display device 100 includes: operation 610 in which the display device 100 displays content on the display panel 140 (see FIG. 7); operation 620 in which the display device 100 rotates the content from a first rotation mode to a second rotation mode; operation 630 in which the display device 100 measures a pitch and a roll, wherein the pitch is a degree to which the display device 100 is tilted with respect to a horizontal plane by its up-down rotation, and the roll is a degree to which the display device 100 is tilted with respect to the horizontal plane by its left-right rotation; and operation 640 in which the display device 100 controls the rotation of the content according to the pitch and the roll.

In operation 640, the display device 100 analyzes the pitch and the roll, and if the degree to which the display device 100 is titled with respect to the horizontal plane is equal to or smaller than a predetermined threshold value, and a touch signal is generated from the display panel 140 (see FIG. 7), the display device 100 may return the content to the first rotation mode.

Also, in operation 640, the display device 100 analyzes the pitch and the roll, and if the degree to which the display device 100 is titled with respect to the horizontal plane exceeds the predetermined threshold value, and a touch signal is generated from the touch panel 140, the display device 100 may return the content to the first rotation mode.

Also, in operation 640, the display device 100 analyzes the pitch and the roll, and if the degree to which the display device 100 is tilted with respect to the horizontal plane exceeds the predetermined threshold value, the display device 100 may return the content to the first rotation mode. This corresponds to the case in which a user tilts the display device 100 such that the display device 100 deviates out of a wrong operation range.

Figure 12:
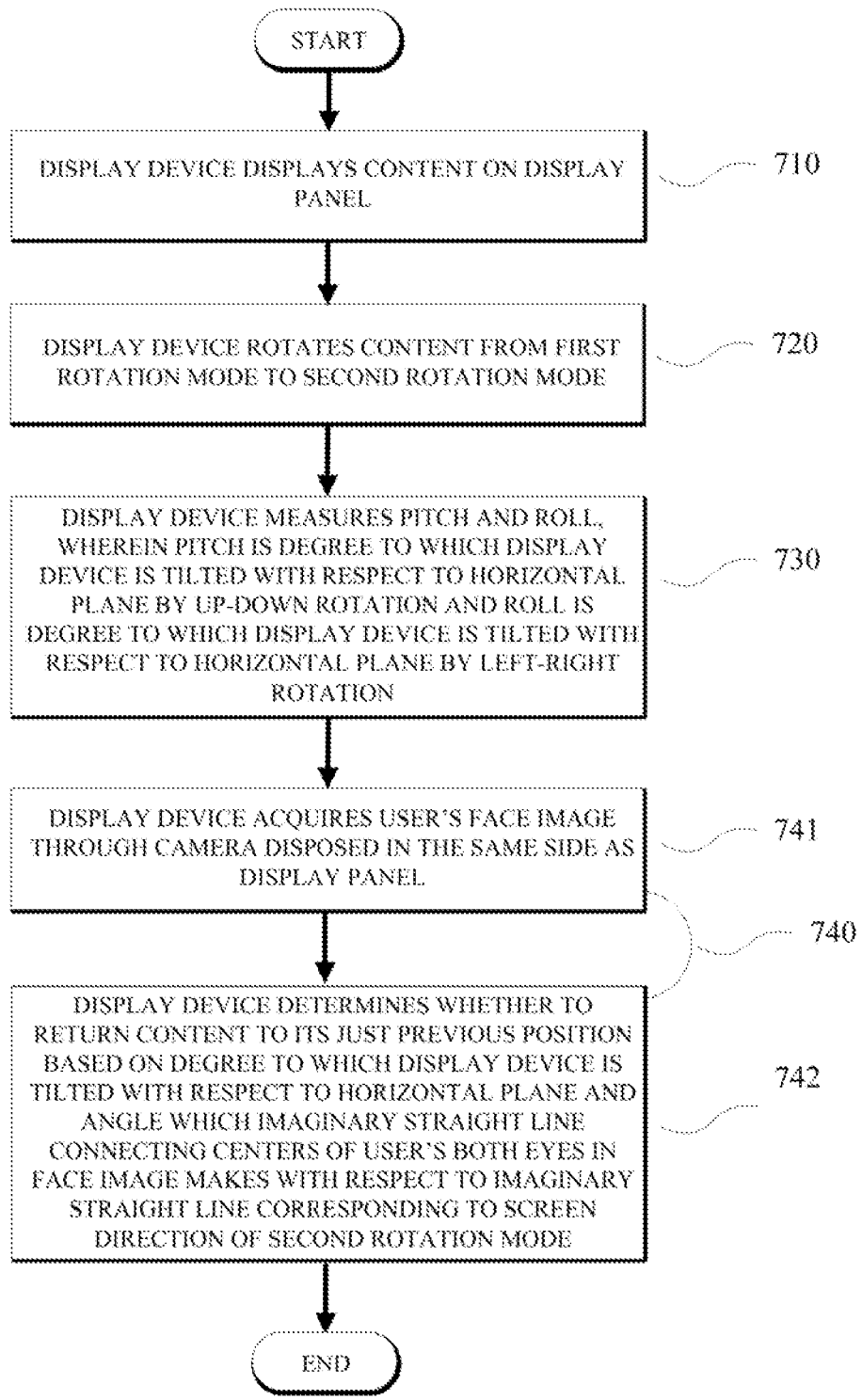
FIG. 12 is a flowchart illustrating an example of a method for controlling a return mode of content displayed on a display device using a camera.

FIG. 12 is a flowchart illustrating an example of a method for controlling a return mode of content displayed on the display device 100 using the camera 160 (see FIG. 7), according to an embodiment of the present invention. The method for controlling the return mode of content displayed on the display device 100 using the camera 160 includes: operation 710 in which the display device 100 displays the content on the display panel 140 (see FIG. 7); operation 720 in which the display device 100 rotates the content from a first rotation mode to a second rotation mode; operation 730 in which the display device 100 measures a pitch and a roll, wherein the pitch is a degree to which the display device 100 is tilted with respect to a horizontal plane by its up-down rotation, and the roll is a degree to which the display device 100 is tilted with respect to the horizontal plane by its left-right rotation; and operation 740 in which the display device 100 controls rotation of the content according to the pitch and the roll.

Operation 740 includes operation 741 in which the display device 100 acquires a user's face image through the camera 160 (see FIG. 7) disposed in the same side as that of the display panel 140; and operation 742 in which the display device 100 determines whether to return the content to its just previous position based on a degree to which the display device 100 is tilted with respect to the horizontal plane and an angle which an imaginary straight line connecting the centers of the user's both eyes in the face image makes with respect to an imaginary straight line corresponding to the screen direction of the second rotation mode.

In operation 742, the display device 100 analyzes the pitch and the roll, and if a degree to which the display device 100 is tilted with respect to the horizontal plane is equal to or smaller than a predetermined threshold value, and an angle which the imaginary straight line connecting the centers of the user's both eyes in the face image makes with respect to the imaginary straight line corresponding to the screen direction of the second rotation mode exceeds a straight line threshold value, the display device 100 may return the content to the first rotation mode.

Also, in operation 742, if the degree to which the display device 100 is tilted with respect to the horizontal plane exceeds the predetermined threshold value, and an angle which the imaginary straight line connecting the centers of the user's both eyes in the face image makes with respect to the imaginary straight line corresponding to the screen direction of the second rotation mode exceeds a straight line threshold value, the display device 100 may return the content to the first rotation mode.

FIG. 13 is a flowchart illustrating an example of a method for controlling rotation and a return mode of content, which is performed by the display device 100, according to an embodiment of the present invention.

Content is displayed on the display device 100 (810), and the control processor 120 (see FIG. 7) senses a degree to which the display device 100 is tilted (820). The degree to which the display device 100 is tilted means an angle which an imaginary plane extending from the display panel 140 (see FIG. 7) of the display device 100 makes with respect to a horizontal plane.

Then, the control processor 120 determines whether the tilting angle of the display device 100 exceeds a predetermined threshold value (830). If the tilting angle of the display device 100 is equal to or smaller than the predetermined threshold value, the control processor 120 stops the auto-rotation of the content (840). If the auto-rotation of the content is stopped, no wrong rotation of the content occurs although the display device 100 is positioned within a wrong operation range.

Meanwhile, if the tilting angle of the display device 100 exceeds the predetermined threshold value, the display device 100 performs the auto-rotation of the content (850). Thereafter, the display device 100 continues to monitor whether a return command is input (860). If a user inputs a return command to the display device 100 while the auto-rotation is being performed, the control processor 120 returns the content to its just previous position or cancels the rotation of the content (870). FIG. 13 shows an example in which a return mode is performed when the display device 100 is not within a wrong operation range (that is, when the display device 100 is in a normal position).

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A display device for controlling rotation of content displayed on the display device, comprising:
 a display panel configured to display the content;
 a sensor configured to measure a pitch $\theta$ and a roll $\Phi$ of the display device, wherein the pitch $\theta$ is a degree to which the display device is tilted with respect to a horizontal plane by an up-down rotation, and the roll $\Phi$ is a degree to which the display device is tilted with respect to the horizontal plane by a left-right rotation; and
 a control processor configured to change a rotation speed of the content rotating on the display panel to change a display orientation between a portrait mode of the display device and a landscape mode of the display device, according to at least one of the measured pitch $\theta$ and the measured roll $\Phi$.

2. The display device of claim 1, wherein the sensor includes at least one of a gravity sensor, a geomagnetic sensor, an accelerometer, and a gyroscope.

3. The display device of claim 1, wherein the control processor does not rotate the content or reduces the rotation speed of the content, when the measured pitch $\theta$ of the display device is within a first threshold range and the measured roll $\Phi$ of the display device is within a second threshold range, and
 the control processor rotates the content at a maximum speed or increases the rotation speed of the content, when the measured pitch $\theta$ of the display device deviates out of the first threshold range and the measured roll $\Phi$ of the display device deviates out of the second threshold range.

4. The display device of claim 3, wherein the first threshold range is $-45 \leq \theta \leq 45$, $-135 \leq \theta \leq -180$, or $135 \leq \theta \leq 180$, and the second threshold range is $-45 \leq \Phi \leq 45$, $-135 \leq \Phi \leq -180$, or $135 \leq \Phi \leq 180$.

5. The display device of claim 1, wherein the control processor controls the rotation speed of the content by referring to a memory in which a rotation speed of content corresponding to at least one of the measured pitch $\theta$ and the measured roll $\Phi$ of the display device is stored or by calculating a rotation speed of content corresponding to at least one of the measured pitch $\theta$ and the measured roll $\Phi$ of the display device.

6. The display device of claim 1, wherein the control processor analyzes the measured pitch $\theta$ or the measured roll $\Phi$ of the display device, and when a degree to which the display device is tilted with respect to the horizontal plane exceeds a predetermined threshold value, the control processor increases the rotation speed of the content according to a degree by which the tilting degree of the display device with respect to the horizontal plane exceeds the predetermined threshold value.

7. The display device of claim 1, wherein when a touch signal is generated from the display panel or a tilting degree of the display device with respect to the horizontal plane exceeds a predetermined threshold value, while the content rotates from a first orientation to a second orientation or after the content has rotated from the first orientation to the second orientation,
 the control processor controls the content to return to the first orientation.

8. The display device of claim 1, further comprising a camera disposed in the same side as that of the display panel and configured to acquire a user's face image,
wherein while the content rotates from a first orientation to a second orientation or after the content has rotated from the first orientation to the second orientation, the control processor controls the content to return to the first orientation, when an angle which an imaginary straight line connecting the centers of the user's both eyes in the user's face image makes with respect to an imaginary straight line corresponding to a screen direction of the second orientation exceeds a straight line threshold value.

9. A method for controlling rotation of content displayed on a display device, comprising:
displaying the content on a display panel of the display device;
measuring a pitch θ and a roll Φ of the display device, wherein the measured pitch θ is a degree to which the display device is tilted with respect to a horizontal plane by an up-down rotation, and the measured roll Φ is a degree to which the display device is tilted with respect to the horizontal plane by a left-right rotation; and
changing a rotation speed of the content rotating on the display panel to change a display orientation between a portrait mode of the display device and a landscape mode of the display device, according to at least one of the measured pitch θ and the measured roll Φ.

10. The method of claim 9, wherein the changing the rotation speed of the content comprises analyzing the measured pitch θ and the measured roll Φ of the display device, not rotating the content or reducing the rotation speed of the content when a degree to which the display device is tilted with respect to the horizontal plane is equal to or smaller than a predetermined threshold value, and rotating the content at maximum speed or increasing the rotation speed of the content when the degree to which the display device is tilted with respect to the horizontal plane exceeds the predetermined threshold value.

11. The method of claim 10, wherein the predetermined threshold value is 45°.

12. The method of claim 9, wherein the changing the rotation speed of the content comprises:
analyzing the measured pitch θ and the measured roll Φ of the display device, and
changing the rotation speed of the content according to the magnitude of the degree to which the display device is tilted with respect to the horizontal plane.

13. The method of claim 12, wherein the changing the rotation speed of the content comprises increasing, when the degree to which the display device is tilted with respect to the horizontal plane exceeds a predetermined threshold value, the rotation speed of the content according to a degree by which the tilting degree of the display device with respect to the horizontal plane exceeds the predetermined threshold value.

14. A method for controlling rotation of content displayed on a display device, comprising:
displaying the content on a display panel of the display device;
measuring a pitch θ and a roll Φ of the display device, wherein the measured pitch θ is a degree to which the display device is tilted with respect to a horizontal plane by an up-down rotation, and the measured roll Φ is a degree to which the display device is tilted with respect to the horizontal plane by a left-right rotation; and
reducing a rotation speed of the content rotating on the display panel to change a display orientation between a portrait mode of the display device and a landscape mode of the display device, when the measured pitch θ of the display device is within a first threshold range and the measured roll Φ of the display device is within a second threshold range.

15. The method of claim 14, further comprising returning to a prior display orientation when a degree to which the display device is tilted with respect to the horizontal plane is equal to or smaller than a predetermined threshold value and a touch signal is generated from the display panel.

16. The method of claim 14, further comprising returning to a prior display orientation when a degree to which the display device is tilted with respect to the horizontal plane exceeds a predetermined threshold value and a touch signal is generated from the display panel.

17. The method of claim 14, further comprising returning to a prior display orientation when a degree to which the display device is tilted with respect to the horizontal plane exceeds a predetermined threshold value.

18. The method of claim 14, wherein the reducing the rotation of the content further comprises acquiring a user's face image with a camera disposed in the same side as that of the display panel, and
wherein the method further comprises returning to a first display orientation when the degree to which the display device is tilted with respect to the horizontal plane is equal to or smaller than a predetermined threshold value and an angle which an imaginary straight line connecting the user's both eyes in the user's face image makes with respect to an imaginary straight line corresponding to a screen direction of a second display orientation exceeds a straight line threshold value.

19. The method of claim 14, wherein the reducing the rotation of the content further comprises acquiring a user's face image through a camera disposed in the same side as that of the display panel, and
wherein the method further comprises returning to a first display orientation when the degree to which the display device is tilted with respect to the horizontal plane exceeds a predetermined threshold value and an angle which an imaginary straight line connecting the user's both eyes in the user's face image makes with respect to an imaginary straight line corresponding to a screen direction of a second display orientation exceeds a straight line threshold value.

* * * * *